(12) United States Patent
Varley

(10) Patent No.: US 10,248,971 B2
(45) Date of Patent: Apr. 2, 2019

(54) METHODS, SYSTEMS, AND DEVICES FOR DYNAMICALLY GENERATING A PERSONALIZED ADVERTISEMENT ON A WEBSITE FOR MANUFACTURING CUSTOMIZABLE PRODUCTS

(71) Applicant: Customer Focus Software Limited, Middleton, Manchester (GB)

(72) Inventor: Martin Roy Varley, London (GB)

(73) Assignee: Customer Focus Software Limited, Middleton (GB)

( * ) Notice: Subject to any disclaimer, the term of this patent is extended or adjusted under 35 U.S.C. 154(b) by 0 days.

(21) Appl. No.: 16/125,370

(22) Filed: Sep. 7, 2018

(65) Prior Publication Data

US 2019/0073697 A1    Mar. 7, 2019

Related U.S. Application Data

(60) Provisional application No. 62/555,493, filed on Sep. 7, 2017.

(51) Int. Cl.
*G06Q 30/02* (2012.01)
*G06Q 50/00* (2012.01)
*G06Q 30/06* (2012.01)

(52) U.S. Cl.
CPC ..... *G06Q 30/0269* (2013.01); *G06Q 30/0275* (2013.01); *G06Q 30/0276* (2013.01); *G06Q 30/0621* (2013.01); *G06Q 50/01* (2013.01)

(58) Field of Classification Search
CPC .................................................. G06Q 30/0269
See application file for complete search history.

(56) References Cited

U.S. PATENT DOCUMENTS 3,968,719 A    7/1976   Sanderson
4,014,242 A    3/1977   Sanderson
(Continued)

FOREIGN PATENT DOCUMENTS

EP    0 642 102       3/1995
WO    WO 2007030397   3/2007
(Continued)

OTHER PUBLICATIONS

Zhang, Optimized Bidding Algorithm for Real Time Bidding in Online Ads Auction, International Conf. on Management Science & Engineering, all pages. (Year: 2014).*

(Continued)

*Primary Examiner* — Jacob C. Coppola
(74) *Attorney, Agent, or Firm* — Knobbe Martens Olson & Bear

(57) ABSTRACT

Various embodiments herein relate to systems, methods, and devices for enhanced targeted digital advertising for customizable products. Various embodiments described herein relate to systems, methods, and devices for dynamically generating a personalized online advertisement for one or more customizable products, which can be tailored to a particular consumer whose identity has been determined, for example, based on consumer information and/or cookie data from an embedded cookie. Various embodiments herein relate to systems, methods, and devices for determining an advertisement for one or more customizable products within an advertisement space on a website, retrieving a logo or graphic based on user information, wherein the logo or graphic can be graphically embedded into a dynamically determined placement on a customized product advertisement, and wherein the user information is obtained from one or more information sources having disparate data structures through one or more network interfaces.

20 Claims, 9 Drawing Sheets

(56) References Cited

U.S. PATENT DOCUMENTS

| | | |
|---|---|---|
| 4,832,513 A | 5/1989 | Ikekita |
| 4,961,154 A | 10/1990 | Pomerantz et al. |
| 5,237,647 A | 8/1993 | Roberts et al. |
| 5,442,129 A | 8/1995 | Mohrlok et al. |
| 5,520,876 A | 5/1996 | Dobler |
| 5,727,138 A | 3/1998 | Harada |
| 5,777,254 A | 7/1998 | Fay et al. |
| 5,817,965 A | 10/1998 | Matsumoto |
| 5,894,310 A | 4/1999 | Arsenault et al. |
| 5,895,476 A | 4/1999 | Orr et al. |
| 5,895,477 A | 4/1999 | Orr et al. |
| 5,900,567 A | 5/1999 | Fay et al. |
| 5,952,597 A | 9/1999 | Weinstock et al. |
| 5,956,737 A | 9/1999 | King et al. |
| 6,090,027 A | 7/2000 | Brinkman |
| 6,166,314 A | 12/2000 | Weinstock et al. |
| 6,276,566 B1 | 8/2001 | Zaksenberg |
| 6,307,140 B1 | 10/2001 | Iwamoto |
| 6,313,836 B1 | 11/2001 | Russell, Jr. et al. |
| 6,336,092 B1 | 1/2002 | Gibson et al. |
| 6,414,693 B1* | 7/2002 | Berger .............. G06Q 10/087 345/641 |
| 6,589,116 B1 | 7/2003 | Grigoriev et al. |
| 6,737,572 B1 | 5/2004 | Jameson et al. |
| 6,816,833 B1 | 11/2004 | Iwamoto et al. |
| 7,006,952 B1 | 2/2006 | Matsumoto et al. |
| 7,016,841 B2 | 3/2006 | Kenmochi et al. |
| 7,050,654 B2 | 5/2006 | Lunetta |
| 7,111,252 B1 | 9/2006 | Harris |
| 7,266,513 B2 | 9/2007 | Chalmers et al. |
| 7,386,565 B1* | 6/2008 | Singh .............. G06F 17/30489 |
| 7,391,424 B2 | 6/2008 | Lonsing |
| 7,447,558 B2 | 11/2008 | Pratt |
| 7,509,477 B2* | 3/2009 | Suponau .......... G06F 17/30616 707/999.001 |
| 7,519,548 B2 | 4/2009 | Hanechak |
| 7,619,638 B2 | 11/2009 | Walker |
| 7,835,591 B2 | 11/2010 | Lunetta |
| 7,899,716 B2 | 3/2011 | Rothman |
| 8,031,207 B2 | 10/2011 | Phillips |
| 8,112,721 B2 | 2/2012 | Nakamura |
| 8,294,713 B1 | 10/2012 | Amanieux |
| 8,533,580 B1 | 9/2013 | Xu |
| 8,579,620 B2 | 11/2013 | Wu |
| 8,600,824 B2 | 12/2013 | Sunkada |
| 8,628,008 B1 | 1/2014 | Lee et al. |
| 8,631,050 B1* | 1/2014 | Gayle .............. G06F 17/30569 707/602 |
| 8,634,089 B2 | 1/2014 | Keane et al. |
| 8,732,003 B2 | 5/2014 | Keane et al. |
| 8,756,114 B2* | 6/2014 | Fredlund .............. G06Q 30/06 705/26.5 |
| 9,087,078 B2 | 7/2015 | Becherer |
| 9,104,298 B1 | 8/2015 | Varley |
| 9,298,816 B2* | 3/2016 | Dimassimo ....... G06F 17/30864 |
| 9,330,110 B2 | 5/2016 | Lin |
| 9,345,264 B1 | 5/2016 | Davila |
| 9,881,407 B1 | 1/2018 | Varley |
| 10,121,513 B2* | 11/2018 | Martinez .............. G11B 27/036 |
| 2001/0043467 A1 | 11/2001 | Carpenter et al. |
| 2002/0032573 A1 | 3/2002 | Williams et al. |
| 2002/0032612 A1 | 3/2002 | Williams et al. |
| 2002/0036654 A1 | 3/2002 | Evans et al. |
| 2002/0085230 A1 | 7/2002 | Kitahara et al. |
| 2002/0161464 A1 | 10/2002 | Weiner |
| 2002/0185212 A1 | 12/2002 | Schaupp et al. |
| 2003/0056410 A1 | 3/2003 | Witkowski |
| 2003/0061217 A1 | 3/2003 | Whittingham et al. |
| 2003/0076538 A1 | 4/2003 | Whittingham et al. |
| 2003/0107568 A1 | 6/2003 | Urisaka et al. |
| 2003/0158786 A1 | 8/2003 | Yaron et al. |
| 2003/0161014 A1 | 8/2003 | Tobita et al. |
| 2003/0165326 A1 | 9/2003 | Blair et al. |
| 2003/0217489 A1 | 11/2003 | Witkowski |
| 2003/0218766 A1 | 11/2003 | Matsumoto |
| 2004/0090507 A1 | 5/2004 | Mabbot |
| 2004/0096601 A1 | 5/2004 | Raymond |
| 2004/0138905 A1 | 7/2004 | Stinson et al. |
| 2004/0165218 A1* | 8/2004 | Fredlund .............. G06Q 30/02 358/1.18 |
| 2005/0120010 A1 | 6/2005 | Philpott et al. |
| 2005/0187106 A1 | 8/2005 | Laney et al. |
| 2005/0224571 A1 | 10/2005 | Kelley et al. |
| 2005/0224572 A1 | 10/2005 | Kelley et al. |
| 2005/0255914 A1 | 11/2005 | McHale et al. |
| 2005/0261963 A1* | 11/2005 | McLaughlin .......... G06Q 30/02 705/14.71 |
| 2005/0264596 A1 | 12/2005 | Little |
| 2006/0009979 A1 | 1/2006 | McHale et al. |
| 2006/0075329 A1 | 4/2006 | Sullivan et al. |
| 2006/0165240 A1 | 7/2006 | Bloom et al. |
| 2006/0184432 A1 | 8/2006 | Hanechak |
| 2006/0202042 A1 | 9/2006 | Chu |
| 2006/0292104 A1 | 12/2006 | Guskey et al. |
| 2007/0024908 A1 | 2/2007 | Hanechak |
| 2007/0043579 A1 | 2/2007 | Kent et al. |
| 2007/0051816 A1 | 3/2007 | Chu |
| 2007/0090010 A1 | 4/2007 | Crabtree et al. |
| 2007/0095707 A1 | 5/2007 | Yahiel |
| 2007/0192210 A1 | 8/2007 | Lunetta |
| 2008/0114611 A1 | 5/2008 | Nichols |
| 2008/0168495 A1 | 7/2008 | Roberts et al. |
| 2008/0213021 A1 | 9/2008 | Silverbrook et al. |
| 2008/0238916 A1 | 10/2008 | Ghosh et al. |
| 2008/0268103 A1 | 10/2008 | Derks et al. |
| 2008/0306749 A1* | 12/2008 | Fredlund .............. G06Q 30/02 705/1.1 |
| 2009/0164339 A1 | 6/2009 | Rothman |
| 2009/0202757 A1 | 8/2009 | Fujio |
| 2009/9256817 | 10/2009 | Perlin et al. |
| 2009/0276089 A1 | 11/2009 | Bartholomew |
| 2009/0298017 A1 | 12/2009 | Boerjes et al. |
| 2010/0073198 A1 | 3/2010 | Wegner et al. |
| 2010/0211885 A1 | 8/2010 | Berg et al. |
| 2010/0245387 A1 | 9/2010 | Bachelder et al. |
| 2010/0293057 A1* | 11/2010 | Haveliwala ........ G06Q 30/0269 705/14.66 |
| 2010/0321405 A1 | 12/2010 | MacInnes et al. |
| 2011/0050848 A1 | 3/2011 | Rohaly et al. |
| 2011/0228995 A1 | 9/2011 | Batman et al. |
| 2011/0282476 A1 | 11/2011 | Hegemier |
| 2012/0036046 A1 | 2/2012 | Anderson |
| 2012/0166276 A1 | 6/2012 | Chintnis et al. |
| 2012/0220494 A1 | 8/2012 | Samuels et al. |
| 2012/0245841 A1 | 9/2012 | Spindler et al. |
| 2012/0245848 A1 | 9/2012 | Spindler et al. |
| 2012/0282476 A1 | 11/2012 | Lu |
| 2013/0073336 A1 | 3/2013 | Heath |
| 2013/0073374 A1 | 3/2013 | Heath |
| 2013/0073388 A1 | 3/2013 | Heath |
| 2013/0076909 A1 | 3/2013 | Marti et al. |
| 2013/0087620 A1 | 4/2013 | Sharma et al. |
| 2013/0091445 A1 | 4/2013 | Treadway et al. |
| 2013/0127980 A1 | 5/2013 | Haddick et al. |
| 2013/0166375 A1* | 6/2013 | YoungLincoln ... G06Q 30/0246 705/14.45 |
| 2013/0215148 A1 | 8/2013 | Antonyuk et al. |
| 2013/0278631 A1 | 10/2013 | Border et al. |
| 2014/0002342 A1 | 1/2014 | Fedorovskaya et al. |
| 2014/0002644 A1 | 1/2014 | Fedorovskaya et al. |
| 2014/0003648 A1 | 1/2014 | Fedorovskaya et al. |
| 2014/0003652 A1 | 1/2014 | Fedorovskaya et al. |
| 2014/0003716 A1 | 1/2014 | Fedorovskaya et al. |
| 2014/0003737 A1 | 1/2014 | Fedorovskaya et al. |
| 2014/0006129 A1 | 1/2014 | Heath |
| 2014/0143082 A1 | 5/2014 | Larson |
| 2014/0195328 A1* | 7/2014 | Ferens .............. G06Q 30/0271 705/14.41 |
| 2014/0214582 A1 | 7/2014 | Gobeyn |
| 2014/0267273 A1 | 9/2014 | Kontkanen |
| 2014/0370158 A1 | 12/2014 | Speck et al. |
| 2015/0220234 A1* | 8/2015 | Qian .................. H04L 63/0876 715/745 |
| 2015/0356119 A1 | 12/2015 | Spielberg |

(56) References Cited

U.S. PATENT DOCUMENTS

| | | | |
|---|---|---|---|
| 2016/0098783 A1* | 4/2016 | Margalit | G06Q 30/0635 705/26.5 |
| 2016/0342860 A1 | 11/2016 | Osipov | |
| 2017/0032252 A1* | 2/2017 | Feminella | G06N 5/022 |
| 2017/0178371 A1 | 6/2017 | Gonzales, Jr. | |
| 2018/0033064 A1 | 2/2018 | Varley | |
| 2018/0204363 A1 | 7/2018 | Varley | |

FOREIGN PATENT DOCUMENTS

| | | |
|---|---|---|
| WO | WO2012/021526 | 2/2012 |
| WO | WO 2015/128707 | 9/2015 |
| WO | WO2015/179757 | 11/2015 |

OTHER PUBLICATIONS

Google Whitepaper, The Arrival of Real-Time Bidding and What it Means for Media Buyers, Google, all pages. (Year: 2011).*

* cited by examiner

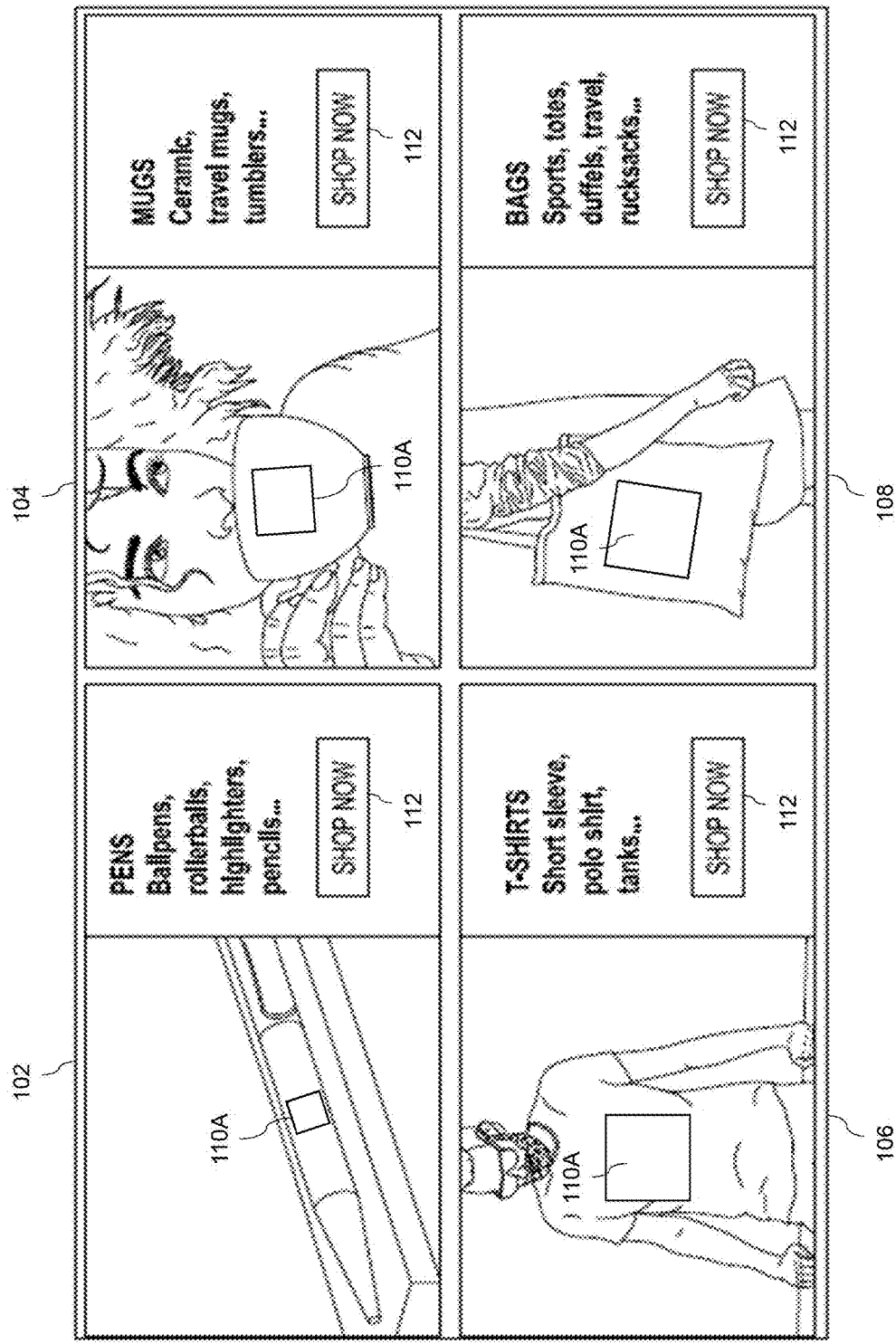

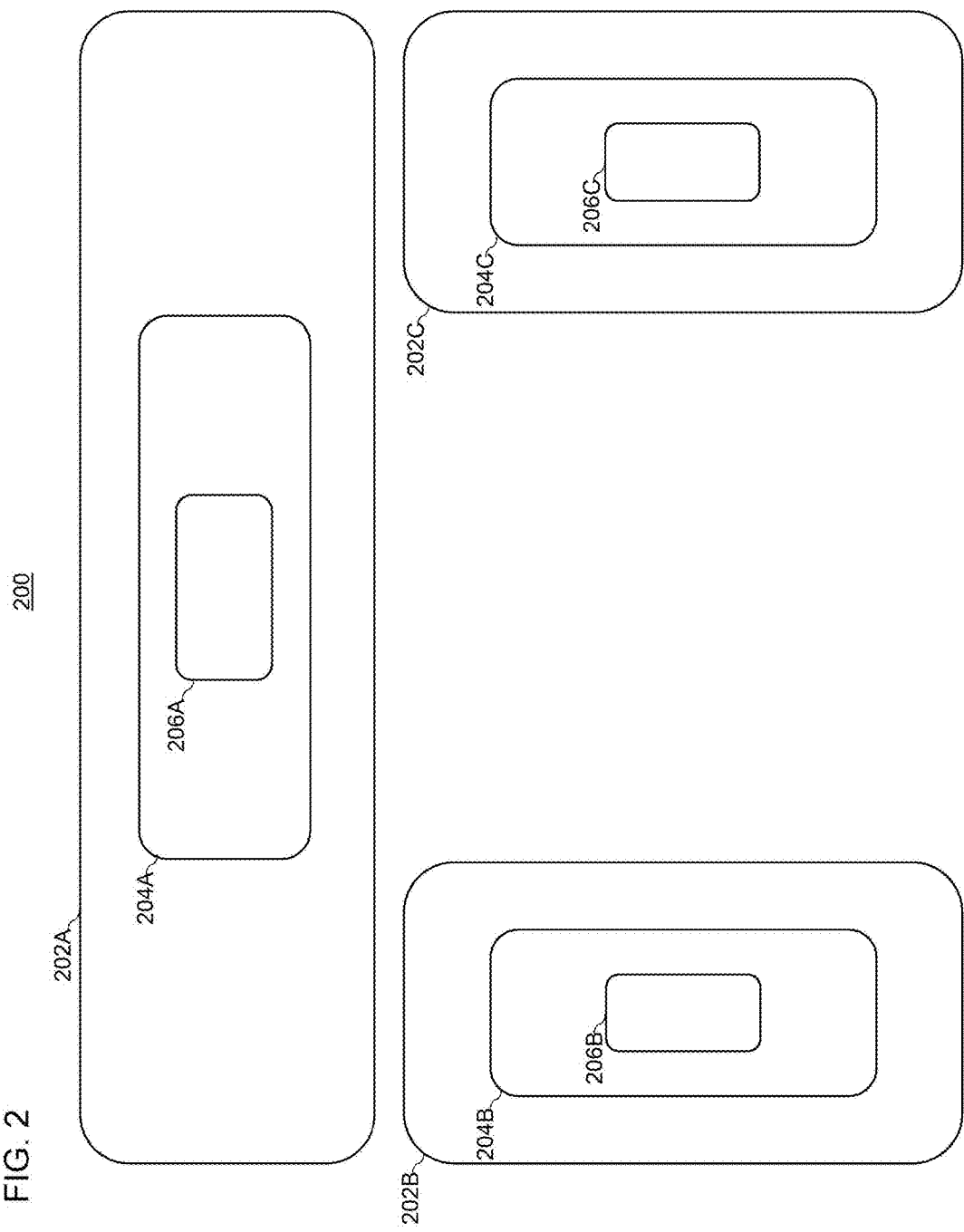

METHODS, SYSTEMS, AND DEVICES FOR DYNAMICALLY GENERATING A PERSONALIZED ADVERTISEMENT ON A WEBSITE FOR MANUFACTURING CUSTOMIZABLE PRODUCTS

CROSS-REFERENCE TO RELATED APPLICATIONS

The present application claims the benefit under 35 U.S.C. 119(c) to U.S. Provisional Patent Application No. 62/555,493 filed Sep. 7, 2017, titled "METHODS, SYSTEMS, AND DEVICES FOR DYNAMICALLY GENERATING A PERSONALIZED ADVERTISEMENT ON A WEBSITE," the entirety of which is hereby incorporated herein by reference under 37 CFR 1.57.

BACKGROUND

Field

Certain embodiments disclosed herein generally relate to systems, methods, and devices for dynamically generating a personalized advertisement on a website or a third-party website for manufacturing customizable products.

Description

Online advertising has proven to be very profitable and effective both for small and large businesses. Users are increasingly engaging in online activity and are exposed to a variety of digital advertisements, comprising, for example, banner ads. These banner ads can be generated by advertisers and can be targeted to a particular audience. However, the products and/or services may not be customized to the user. The advertisements can often display generic products and/or services, and often times many users are shown the same advertisements. Accordingly, current advertising technology may not allow for personalized advertisements. New methods, systems, and devices for personalized advertisements are needed.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Some embodiments herein relate to a computer-implemented method for dynamically generating a personalized online advertisement for one or more customizable products, the method comprising: determining or retrieving, by a computer system, an identity of a user requesting a website by use of one or more cookies embedded in the website; determining, by the computer system, an advertisement for one or more customizable products for placement within an advertisement space on the website for viewing by the user; dynamically obtaining, by the computer system, user information of the user based at least in part on the identity of the user by: identifying one or more information sources that comprise user information of the user, wherein the one or more information sources comprise one or more social media websites, company websites, personal websites, news media websites, and ad exchange databases; determining or converting one or more network interfaces of the computer system for communicating with the one or more identified information sources; automatically retrieving user information of the user from the one or more identified information sources through the one or more network interfaces; and normalizing the user information retrieved from the one or more identified information sources; verifying, by the computer system, the retrieved user information by comparing the retrieved user information from the one or more identified information sources; identifying and retrieving, by the computer system from a logo database, one or more logos associated with the employer or organization of the user; modifying, by the computer system, the determined advertisement for one or more customizable products by: identifying one or more locations for logo placement on the one or more customizable products; graphically embedding the one or more logos associated with the employer or organization of the user onto the one or more locations for logo placement on the one or more customizable products; and embedding one or more selectable links on the determined advertisement, wherein selecting the one or more selectable links causes retrieval of a purchase website for purchasing the one or more customizable products comprising the one or more logos; and transmitting, by the computer system, the modified advertisement for one or more customizable products for placement on the website for viewing by the user, wherein the computer system comprises a computer processor and an electronic storage medium.

Some embodiments herein relate to a computer-implemented method comprising receiving, by the computer system, a selection of the one or more customizable products comprising the one or more logos for purchase on the purchase website.

Some embodiments herein relate to a computer-implemented method comprising dynamically generating, by the computer system, a print-ready file for printing the one or more logos on the selected one or more customizable products.

Some embodiments herein relate to a computer-implemented method comprising electronically transmitting, by the computer system, the print-ready file to a manufacturing system.

Some embodiments herein relate to a computer-implemented method, wherein the transmitting of the print-ready file to the manufacturing system causes manufacturing of the one or more customizable products comprising the one or more logos.

Some embodiments herein relate to a computer-implemented method comprising receiving, by the computer system, a selection of the one or more customizable products comprising the one or more logos for purchase on the purchase website.

Some embodiments herein relate to a computer-implemented method comprising dynamically generating, by the computer system, an alert to a manufacturing system to manufacture the one or more customizable products comprising the one or more logos.

Some embodiments herein relate to a computer-implemented method comprising electronically transmitting the alert to the manufacturing system.

Some embodiments herein relate to a computer-implemented method, wherein the transmitting the alert initiates manufacturing of the one or more customizable products comprising the one or more logos.

Some embodiments herein relate to a computer-implemented method, wherein the identity of the user is retrieved from a third-party database.

Some embodiments herein relate to a computer-implemented method, wherein the third-party database is an advertisement exchange.

Some embodiments herein relate to a computer-implemented method, wherein the one or more cookies is embedded in a header of the website.

Some embodiments herein relate to a computer-implemented method, wherein automatically retrieving user information of the user from the one or more identified information sources comprises crawling the one or more identified information sources.

Some embodiments herein relate to a computer-implemented method, wherein the one or more logos comprise a first logo and a second logo.

Some embodiments herein relate to a computer-implemented method, wherein the one or more customizable products comprises a first customizable product and a second customizable product.

Some embodiments herein relate to a computer-implemented method, wherein the first logo is graphically embedded on one or more locations for logo placement on the first customizable product.

Some embodiments herein relate to a computer-implemented method, wherein the second logo is graphically embedded on one or more locations for logo placement on the second customizable product.

Some embodiments herein relate to a computer-implemented method, wherein determining or converting one or more network interfaces is based at least in part on one or more communication protocols used by the one or more information sources.

Some embodiments herein relate to a computer-implemented method, wherein normalizing the user information retrieved from the one or more identified information sources comprises translating a data structure of the retrieved user information from the one or more identified information sources.

Some embodiments herein relate to a computer-implemented method, wherein the modified advertisement comprises a link for purchasing each of the one or more customizable products comprising the one or more logos.

Some embodiments herein relate to a computer-implemented method, wherein the one or more identified information sources comprises information of a third-party.

Some embodiments herein relate to a computer-implemented method, wherein the third-party is associated with the user.

Some embodiments herein relate to a computer-implemented method, wherein the information of the third-party is used for verifying the user information.

Some embodiments herein relate to a computer-implemented method, wherein the logo database comprises a third-party database accessible by the computer system through a third-party API.

Some embodiments herein relate to a computer-implemented method, wherein the computer system comprises the logo database.

Some embodiments herein relate to a computer-implemented method, wherein the computer system comprises a user profile database.

Some embodiments herein relate to a computer-implemented method comprising generating, by the computer system, a user profile comprising the retrieved user information.

Some embodiments herein relate to a computer-implemented method comprising storing, in the user profile database, the user profile.

Some embodiments herein relate to a computer-implemented method, wherein the user profile is updated to reflect a selection of the one or more selectable links by the user.

Some embodiments herein relate to a computer-implemented method, wherein determining an advertisement for the one or more customizable products comprises a real-time bidding (RTB) on the advertisement space.

Some embodiments herein relate to a computer-implemented method comprising dynamically calculating whether the retrieved user information meets a threshold sufficiency level.

Some embodiments herein relate to a computer-implemented method, wherein the calculation is based at least in part on the verification of the retrieved user information.

Some embodiments herein relate to a computer-implemented method, wherein the one or more logos are generic logos when the retrieved user information does not meet the threshold sufficiency level.

BRIEF DESCRIPTION OF THE DRAWINGS

A better understanding of the devices and methods described herein will be appreciated upon reference to the following description in conjunction with the accompanying drawings, wherein:

FIG. 1A illustrates example digital advertisements according to various embodiments herein;

FIG. 2 illustrates an example web page interface comprising example advertisement spaces according to various embodiments described herein;

DETAILED DESCRIPTION

Figure 1B:
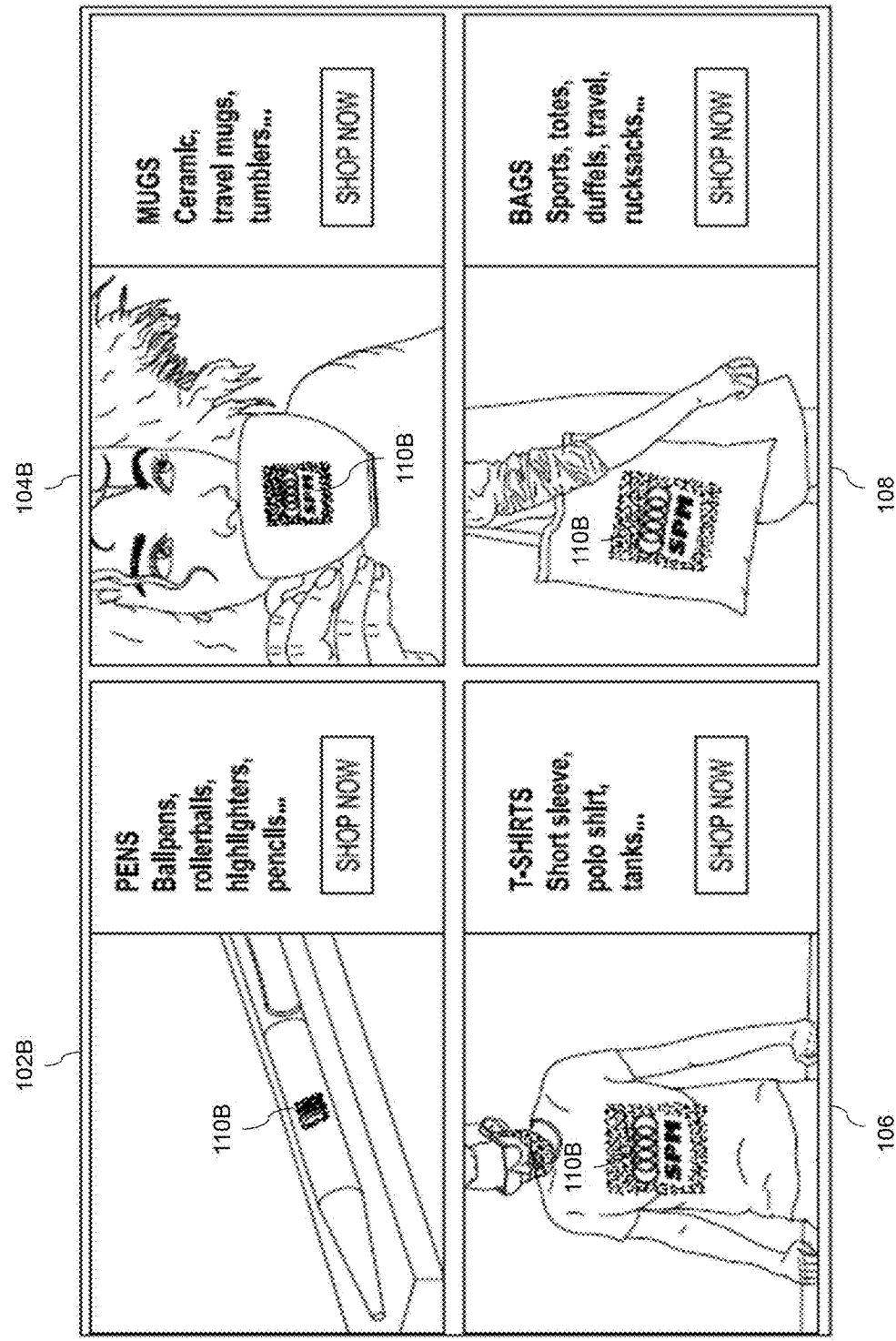
FIG. 1B illustrates example enhanced personalized digital advertisements according to various embodiments described herein.

Online advertising has proven to be very profitable and effective both for small and large businesses. Users are increasingly engaging in online activity and are exposed to a variety of digital advertisements, comprising, for example, banner ads. These banner ads can be generated by advertisers and can be targeted to a particular audience. However, the products and/or services may not be customized to the user. The advertisements can often display generic products and/or services, and often times many users are shown the same advertisements. Accordingly, current advertising technology may not allow for targeting advertisements.

In particular, advertisements for customizable products may generally comprise displaying a banner ad or other ad showing a generic customizable product, such as a t-shirt, coffee mug, pen, or the like. Within the customizable product, generic wording, such as "YOUR COMPANY LOGO HERE" may be shown. However, such generic advertisements for customizable products may not be effective in capturing the audience and/or lead to sales. Rather, in order to maximize returns on an online advertisement for customizable products, it can be advantageous to display a user's company name or logo or other organization name or logo that the user is actually associated with. However, there can be numerous technical hurdles or challenges that need to be addressed in order for a computer system to automatically and/or dynamically generate such highly personalized or user-targeted online advertisements for customizable products. Certain embodiments described herein provide solutions for such technical problems to allow highly targeted personalized advertisements for customizable products that incorporate the logo and/or name of an individual user's actual company, interests, organization, or the like.

As will be described in more detail, various embodiments herein relate to systems, methods, and devices for enhanced targeted digital advertising. In some embodiments, the systems, methods, and devices herein are directed to targeting receptive users or consumers to serve digital advertisements, wherein the content of the advertisement may be generated by analyzing user data or information, including user traits or characteristics. In some embodiments, the user traits can be demographic, behavioral, or psychographic in nature.

Various embodiments herein address solving technical problems associated with targeted and personalized advertisement generation computer systems. Various systems, devices, and methods described herein are directed to generation and modification of network interfaces which allow more efficient communication with various disparate information sources having different data structures. Furthermore, traditional customizable product generation computer systems require user input of a logo or graphic to be placed on a product or image. Conversely, various embodiments herein are related to automatic generation of a graphic or logo, such that no user input may be required. In some embodiments, the network interface capabilities described herein allow for more accurate and efficient collection of user information, which, in turn, enables determination and retrieval of relevant graphics and/or logos that more effectively attract users to the targeted and personalized advertisements.

Various embodiments herein relate to generating a personalized digital advertisement comprising a product, wherein the product is displayed with a system-determined logo or graphic based on user information obtained by the system. In some embodiments, generation of the personalized advertisement requires pre-processing of the product advertisement. For example, various embodiments herein are directed to determining one or more locations within the product advertisements on which a logo or graphic should be placed. Some embodiments are directed to embedding a selectable link in the personalized product advertisement, wherein the selectable link directs a user's web browser to a product purchase page. Upon user purchase, some embodiments herein allow for generation of a print ready file of the customizable product and electronic transmission of the file and instructions to a manufacturing system.

In some embodiments, user data and/or user information can be obtained and utilized by the systems, methods, and devices herein. In some embodiments, the user data and/or user information may be obtained by tracking the online activity of a user or group or users, correlating historical website user information with new user information, analyzing search terms entered by a user, analyzing accessed website content and keywords (e.g. contextual advertising), interfacing with internet service provider (ISP) or other third-party databases, accessing social media user profile or post data, analyzing user software or hardware status (e.g. available network bandwidth), and/or other like methods of obtaining user data and/or user information.

Various embodiments described herein relate to systems, methods, and devices for generating a customized advertisement, which can be tailored to a particular consumer, for example, based on consumer information and/or cookie data. In some embodiments, cookie data can be used to retrieve consumer data or user information, such as by identifying prior browsing history of a user and/or retrieving user personal information (for example, a name, occupation, or age of the user). In some embodiments, information about the consumer or user can be used to generate and/or modify an advertisement to create a personalized advertisement. In some embodiments, the personalized advertisement can comprise portions of the consumer information and/or related pictures or videos (for example, a logo or image related to a person's employer). In some embodiments, the personalized advertisement can be transmitted by, for example, a personalized advertisement generation and management system, to a website for display, such as a third-party website.

Various embodiments described herein address one or more shortcomings of current digital advertisement technology. In some embodiments, the personalized advertisement generation and management system described herein can dynamically generate an advertisement that may allow a user or consumer to preview a personalized product on a website, wherein the personalization may be based on information collected on the particular user or consumer and/or a target audience. As such, a personalized advertisement for a product and/or service can be customized based on user information. For example, cookie data indicating that a user is employed at a particular company can be used to place the company logo onto a mug for an advertisement image. In some embodiments, a digital advertisement that comprises a mug with the company logo can be shown to the user. Accordingly, the efficacy of the advertisement can be improved because the product and/or service can be customized to the targeted person instead of displaying a generic picture of the product and/or service. The advertisement can be a targeted advertisement. In some embodiments, logos or graphics may be placed on products to be displayed to a user in a targeted advertisement based on user data indicating membership of an organization, participation in an activity, age, gender, socio-economic class, preferred brands, user location, nationality, ethnicity, relationship status, home address, and any other ascertainable user characteristic.

Various embodiments herein are directed to collecting user information to be used to generate a customizable and personalized product advertisement. User information can comprise a selection of one or more logos. User information can comprise a user's personal information, such as a user's name, and/or family status, membership in an organization, participation in an activity, age, gender, socio-economic class, preferred brands, user location, nationality, ethnicity, relationship status, home address, work address and any other ascertainable user characteristic. For example, a user's name and the fact that he is a father can be retrieved to identify products and/or services of interest, as well as corresponding advertisements. For example, the advertisement can be modified such that a mug includes the words "world's best dad" embroiled on the face. In some embodiments, user information can also comprise information such as demographic data, sex, race, economic status, age, level of education, income level and employment, psychiatric data, medical data, a personality trait, an interest, values, attitudes, lifestyles, opinions, preferences, likes or dislikes, predilections, purchase history, browser history, financial history and data, credit history and data, personal history and data, other activity data, and/or the like. For example, user information may comprise data indicating that the user is middle-aged, enjoys the outdoors, and is vegetarian. In some embodiments, user information can comprise data indicating an attribute. In some embodiments, an attribute can comprise a computing device (such as a cell phone, or a computer), a channel of communication (such as television. Internet, or a website), advertising media (such as a billboard or commercial), social media (such as a user profile or friends list on a social media website), a particular profile (financial profile for a certain region, subscriber profile for subscribers on a particular website, social media profile for a particular age), other information that can be used to direct a script to, and/or the like.

Some embodiments herein relate to the collection of user information from various disparate databases. In some embodiments, the systems, methods, and devices herein are directed to interfacing with a plurality of disparate databases and/or information sources which store data having a plurality of incongruent data structures. In some embodiments, the systems and devices herein may be configured to interface with these data structures and conduct a normalization process to transform the data into a single, unified data structure. In some embodiments, normalization of the user information data can increase the accuracy and efficiency of verifying the user information and determining/retrieving a logo or graphic to use in a personalized product advertisement. In some embodiments, normalizing the user information retrieved from the one or more identified information sources comprises translating a data structure of the retrieved user information from the one or more identified information sources.

Various embodiments herein relate to determination of a personalized logo for insertion into a customizable product advertisement. In some embodiments, the determination may be based on the identity of the user and retrieved user information. For example, an advertiser or the systems or devices herein may obtain user information indicating user membership in an organization or employment at an employer. In some embodiments, systems or devices herein may decide to use the organization and/or employer logo. In some embodiments, the determination of the logo may be based on any user characteristic, trait, membership, demographic data, sex, race, economic status, age, level of education, income level and employment, psychiatric data, medical data, personality, interest, value, attitude, lifestyle, opinion, preference, like or dislike, predilection, purchase history, browser history, financial history and data, credit history and data, personal history and data, other activity data, and/or the like. In some embodiments, systems, devices, and methods herein are directed to automatically retrieving user information of the user from one or more information sources by crawling the one or more identified information sources.

Various embodiments herein are directed to verifying user information retrieved from one or more user information sources. In some embodiments, user information retrieved from a first information source is cross-checked with user information retrieved from one or more other user information databases. In some embodiments, user information directed to a first user may be cross-checked with user information directed to a second user. In some embodiments, user information is stored in a user profile database, which can be updated automatically at specified intervals or upon the user requesting a website or web page.

Various embodiments herein relate to the utilization of user information collected from various user information sources. In some embodiments, the user information can be used to generate or retrieve a personalized logo for insertion into a personalized and targeted advertisement. In some embodiments, the user information can be used to generate or retrieve a personalized logo to be placed within one or more products on a product webpage or purchase webpage, such as an online storefront. In some embodiments, a user identification and/or user information can be used to auto-populate some or all products on a web storefront, such that some or all products comprise a personalized and targeted logo based on the collected user information or user identification. In some embodiments, user information can be used to generate personalized email advertisements (e.g. flyer type emails containing a personalized logo), can be distributed or sold to third-parties for marketing purposes, and/or can be transmitted to industry professionals or employment services.

Some embodiments herein relate to user identification and/or collection of user information using collected user login credentials. In some embodiments, the login credentials inputted by a user on a website are collected and analyzed by the system to identify the user and/or determine one or more characteristics of the user. In some embodiments, user identification or user information collected in this manner can be verified by cross-checking user information collected from one or more information sources, as described herein.

Various embodiments herein are directed to dynamic and automatic graphically embedded logos. In some embodiments, the logos can be embedded into a customizable product within an advertisement or product web page. In some embodiments, the graphical embedding provides a user with an effective visualization of a customized product according to the user information obtained from various information sources. In some embodiments, a graphic and/or logo can be embedded prior to sending the advertisement to a user device. In some embodiments, a graphic and/or logo can be transmitted separately from the advertisement and combined on the user device by generating a pre-determined placement for the graphic and/or logo to be embedded into the advertisement.

Various embodiments herein are directed to creating, modifying, or altering a print-ready file to be used to manufacture a customizable product comprising a graphically embedded logo. In some embodiments, a print-ready file produces high-resolution printed output, without requiring any additional alteration or intervention. In some embodiments, the print-ready files generated herein comprise high-resolution PDF files, layout files, such as InDesign, Illustrator, or Photoshop files, QuarkXPress files, EPS files, PSD files, JPG files, AI files, TIF files, Word, Publisher, or PowerPoint files, or any other file format suitable for personal and/or commercial printing applications. In some embodiments, these print-ready files can be utilized for printing or manufacturing 2-D or 3-D products containing a personalized graphically embedded logo.

The systems, methods, and devices described herein have various advantages. Targeted (i.e. ad directed to a specific consumer) and customized (i.e. ad, product, and/or service are personalized when displayed to the specific consumer) can provide more effective delivery of a desired product and/or service to a consumer, and can allow the consumer to visualize the customized product and/or service more effectively. For advertisers, targeted and customized advertisement created according to various embodiments herein can enhance advertising efficiency by providing a better understanding of consumer through acquisition of consumer information and data, and producing higher conversion and yields through personalization of advertised products and/or services.

FIG. 1A illustrates example digital advertisements according to various embodiments herein. In some embodiments, one or more advertisements 102, 104, 106, 108 can be designated, identified, or otherwise selected to fill an advertisement space on a website or webpage requested by a user. In some embodiments, the one or more advertisements 102, 104, 106, 108 may be determined by real-time bidding (RTB) on the advertisement space. In some embodiments, in response to a request from the user's browser, a web page is sent to the web browser containing one or more cookies and/or one or more links which cause the web browser to connect to an advertisement server. In some embodiments, the advertisement server may communicate with a supply-side platform server, which receives user information and generates an offer of the advertisement space to be placed on an advertisement exchange. In some embodiments, the advertisement exchange places the offer for bidding on one or more demand-side platforms. In some embodiments, through an RTB process, bids are submitted and a winning bidder is selected. In some embodiments, the winning bid is selected in about 10 milliseconds upon placement of the offer. In some embodiments, a link to an advertisement of the winning bidder is transmitted to the user's web browser, which can request the advertisement from the advertisement server.

In some embodiments, the one or more advertisements 102, 104, 106, 108 may be selected and served by a website publisher. In some embodiments, the one or more advertisements 102, 104, 106, 108 may be selected and served by an advertising agency.

In some embodiments, the one or more advertisements 102, 104, 106, 108 may comprise one or more products. In some embodiments, an advertiser and/or personalized advertisement generation and management system may identify or determine, within one or more of advertisements 102, 104, 106, 108, one or more locations, slots, spaces, or positions 110A within which a logo or other graphic can be placed. In some embodiments, the one or more locations, slots, spaces, or positions 110A comprise a geometric shape, such as a square, rectangle, circle, triangle, pentagon, hexagon, oval, octagon, or other polygon or curved shape. In some embodiments, the size of the one or more locations, slots, spaces, or positions 110A is determined based on the characteristics of the product contained within the one or more advertisements 102, 104, 106, 108. In some embodiments, the one or more locations, slots, spaces, or positions 110A may be identified or determined based on a spatial analysis of the product depicted in the advertisement. In some embodiments the one or more locations, slots, spaces, or positions 110A may be determined based on a product-specific default placement. For example, a T-shirt may have a default placement in the center of the front or back of the shirt. In some embodiments, the one or more locations, slots, spaces, or positions 110A may be chosen to maximize visibility of the logo or graphic to be placed within.

In some embodiments, the one or more advertisements 102, 104, 106, 108 may include one or more selectable links 112, which, when selected by a user, directs the user to a product website or other web location. In some embodiments, some of or the entirety of the one or more advertisements 102, 104, 106, 108 can be a selectable link, such that selection of any part of the advertisement directs the user to a product website or other web location.

FIG. 1B illustrates example enhanced personalized digital advertisements according to various embodiments described herein. In some embodiments, one or more logos or graphics 110B can be placed, by an advertiser or the personalized advertisement generation and management system, within the one or more determined or identified locations, slots, spaces, or positions 110A. In some embodiments, the one or more logos or graphics 110B can be selected based on user information retrieved by an advertiser or by the personalized advertisement generation and management system. In some embodiments, the one or more logos or graphics 110B can be chosen based on the size, shape, or other characteristic of the one or more locations, slots, spaces, or positions 110A. In some embodiments, the one or more logos or graphics 110B are altered before or during insertion into the one or more locations, slots, spaces, or positions 110A. For example, the logos or graphics 100B can be enlarged, minimized, colored, tinted, shadowed, masked, blurred, framed, bordered textured, layered, blended, smoothed, liquefied, curved, shined, illuminated, mirrored, cropped, sectored, resized, or otherwise altered. In some embodiments, the one or more logos or graphics are retrieved by the advertiser or by the personalized advertisement generation and management system from an internal or third-party logo database.

In some embodiments, the one or more logos or graphics 110B comprise a first logo and a second logo, wherein the one or more customizable products comprises a first customizable product and a second customizable product, wherein the first logo is graphically embedded on one or more locations 110A for logo placement on the first customizable product 102, and wherein the second logo is graphically embedded on one or more locations 110A for logo placement on the second customizable product 104.

FIG. 2 illustrates an example web page interface 200 comprising example advertisement spaces according to various embodiments described herein. In some embodiments, a web page may comprise one or more advertisement spaces 202A, 202B, 202C. In some embodiments, the one or more advertisement spaces 202A, 202B, 202C may comprise web banner or banner advertisement spaces. In some embodiments, the one or more advertisements spaces 202A, 202B, 202C may comprise one or more advertisements 204A, 204B, 204C. In some embodiments, the one or more advertisements 204A, 204B, 204C may comprise a banner advertisement, frame advertisement, pop-up advertisement, pop-under advertisement, floating advertisement, expanding advertisement, trick banner advertisement, news feed advertisement, or other advertisement type. In some embodiments the one or more advertisements 204A, 204B, 204C may be configured to incorporate video, audio, animations, selectable links, buttons, forms, or other interactive elements. In some embodiments, the one or more advertisements 204A, 204B, 204C comprise one or more products 206A, 206B, 206C. In some embodiments, the one or more products comprise any tangible or intangible product.

Figure 3:
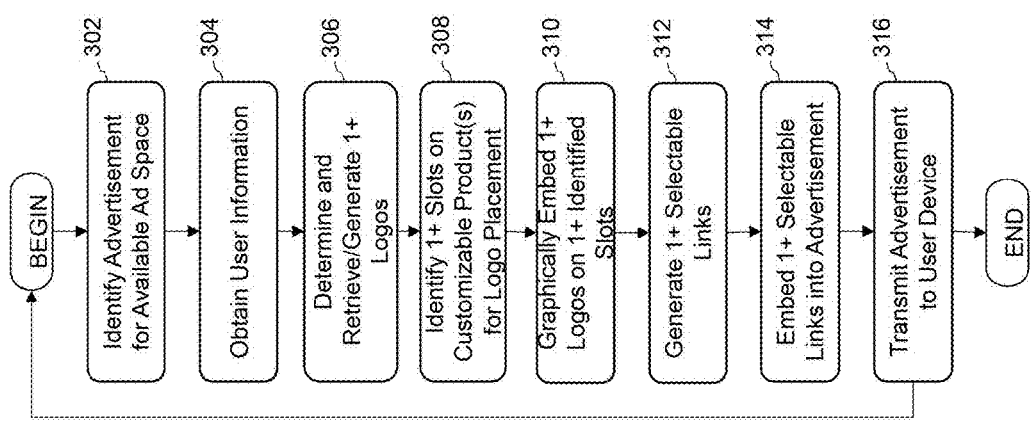
FIG. 3 is a flowchart illustrating a method of generating an enhanced personalized digital advertisement according to various embodiments described herein.

FIG. 3 is a flowchart illustrating a method of generating an enhanced personalized digital advertisement according to various embodiments described herein. In some embodiments, at 302, an advertiser or a personalized advertisement generation and management system may identify or determine an advertisement for an available advertisement space by RTB, a website publisher, an advertisement agency, or otherwise, as described in detail herein.

In some embodiments, at 304, the advertiser or the personalized advertisement generation and management system may identify a user and obtain user information, through for example, a cookie embedded in the web page and/or advertisement space. In some embodiments, the advertiser or a personalized advertisement generation and management system may obtain user information including demographic information, purchase history, web browsing history, social media data personal information, and any other available information. In some embodiments, the advertiser or a personalized advertisement generation and management system may obtain information from data retried from, for example, customer relationship management (CRM) platforms, social media platforms, media platforms, cookie pools, external publications and platforms, advertisement servers, analytics platforms, publishers, third-party providers, and/or any other information source.

In some embodiments, at 306, the advertiser or the personalized advertisement generation and management system may determine and/or generate/retrieve one or more logos to be placed within the determined advertisement. In some embodiments, the determination may be based on the identity of the user and the retrieved user information. For example, the advertiser or system may obtain user information indicating user membership in an organization or employment at an employer. In some embodiments, the advertiser or system may decide to use the organization and/or employer logo. In some embodiments, the determination of the logo may be based on any user characteristic, trait, membership, demographic data, sex, race, economic status, age, level of education, income level and employment, psychiatric data, medical data, personality, interest, value, attitude, lifestyle, opinion, preference, like or dislike, predilection, purchase history, browser history, financial history and data, credit history and data, personal history and data, other activity data, and/or the like. In some embodiments, the personalized advertisement generation and management system can be configured to automatically retrieve user information of the user from one or more information sources by crawling the one or more identified information sources.

In some embodiments, at 308, the advertiser or the personalized advertisement generation and management system may identify one or more slots or locations for logo placement on a customizable product within the advertisement, as described in detail herein.

In some embodiments, at 310, the advertiser or the personalized advertisement generation and management system may graphically embed the one or more determined logos within the one or more slots or locations within the customizable product within the advertisement. In some embodiments, the one or more logos may need to be altered in order to ensure proper presentation within the advertisement, as described in detail herein.

In some embodiments, at 312, the advertiser or the personalized advertisement generation and management system may generate one or more selectable links comprising, for example, one or more uniform resource locators (URLs).

In some embodiments, at 314, the advertiser or the personalized advertisement generation and management system can embed one or more selectable links within the advertisements. In some embodiments, the one or more selectable links, when selected, direct a user to a product information or purchase web page.

In some embodiments, at 316, the advertiser or the personalized advertisement generation and management system can transmit the advertisement comprising the modified customized product with the determined logo to a user browser on a user device for viewing by the user.

In some embodiments, the process of FIG. 3 may be completed multiple times upon a user browser's request to load a web page. In some embodiments, the process can be completed for each advertisement space of a plurality of advertisement spaces present on a website or web page.

Figure 4:
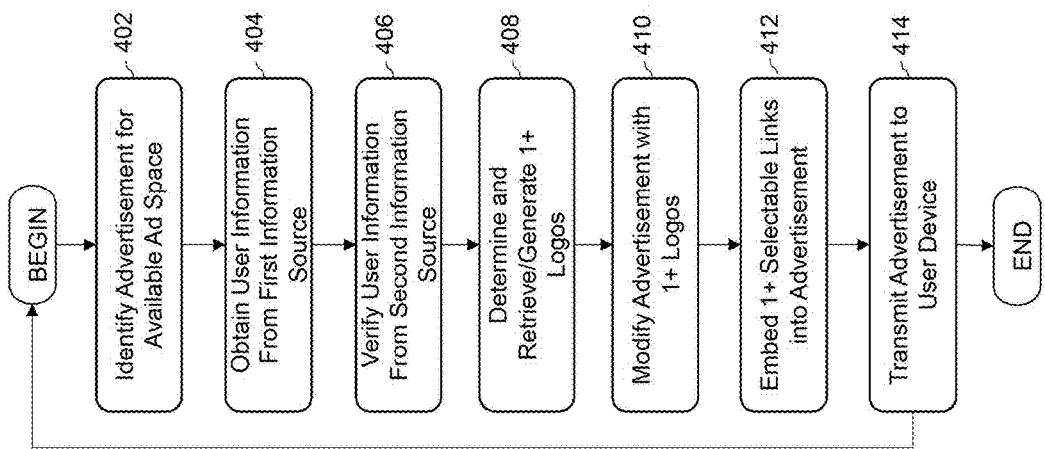
FIG. 4 is a flowchart illustrating another method of generating an enhanced personalized digital advertisement according to various embodiments described herein.

FIG. 4 is a flowchart illustrating another method of generating an enhanced personalized digital advertisement according to various embodiments described herein. In some embodiments, at 402, an advertiser or a personalized advertisement generation and management system may identify or determine an advertisement for an available advertisement space by RTB, a website publisher, an advertisement agency, or otherwise, as described in detail herein.

In some embodiments, at 404, the advertiser or the personalized advertisement generation and management system can obtain user information from a first information source. The first information source can comprise an internal or external database or any of the information sources described herein, including, for example, customer relationship management (CRM) platforms, social media platforms, media platforms, cookie pools, external publications and platforms, advertisement servers, analytics platforms, publishers, third-party providers, and/or any other information source.

In some embodiments, at 406, the advertiser or the personalized advertisement generation and management system can verify the user information retrieved from the first information source by referencing a second information source. The second information source can comprise an internal or external database or any of the information sources described herein. In some embodiments, verification comprises dynamically calculating whether the retrieved user information source meets a threshold sufficiency level, wherein the calculation is based at least in part on the verification of the retrieved user information from the first information source. In some embodiments, the verification may comprise inspection of multiple information sources, including, for example, determining frequency of user visits to websites, existence and frequency of user-entered search terms, existence and frequency of terms within social media profiles, inspection of related third-party information such as social media connections or suspected colleagues.

In some embodiments, at 408, the advertiser or the personalized advertisement generation and management system can determine and retrieve/generate one or more logos based on the verified user information.

In some embodiments, at 410, the advertiser or the personalized advertisement generation and management system can modify the advertisement by insertion of the one or more retrieved/generated logos.

In some embodiments, at 412, the advertiser or the personalized advertisement generation and management system can generate and embed one or more selectable links that, when selected, direct a user's web browser to another web site or web page, for example, a third-party product page.

In some embodiments, at 414, the advertiser or the personalized advertisement generation and management system can transmit the modified advertisement to a user device or user access point, via, for example, a one or more website systems.

In some embodiments, the process of FIG. 4 may be completed multiple times upon a user browser's request to load a web page. In some embodiments, the process can be completed for each advertisement space of a plurality of advertisement spaces present on a website or web page.

Figure 5:
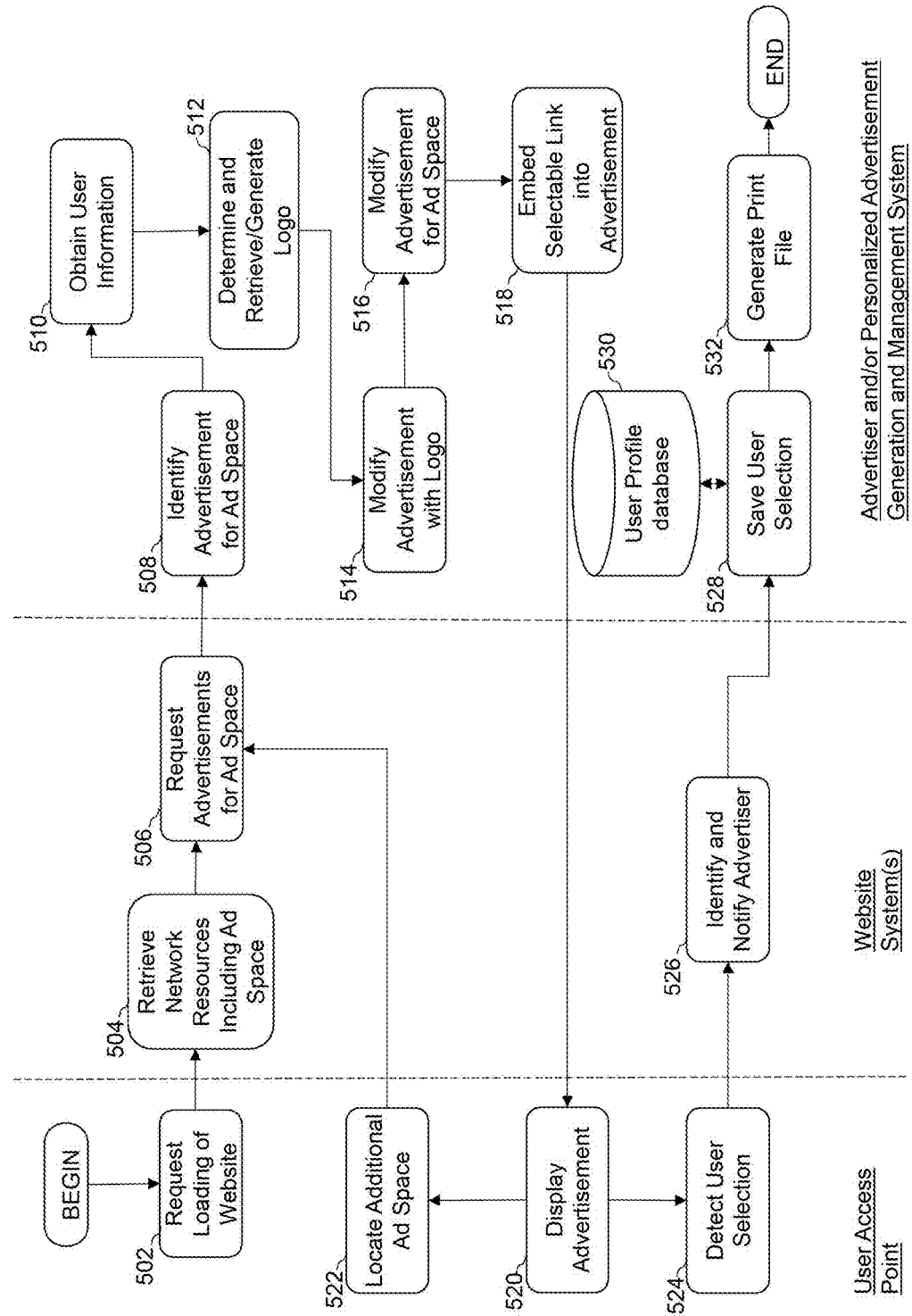
FIG. 5 is a flowchart illustrating another method of generating an enhanced personalized digital advertisement according to various embodiments described herein.

FIG. 5 is a flowchart illustrating another method of generating an enhanced personalized digital advertisement according to various embodiments described herein. In some embodiments, at 502, the user access point system can request loading of a website. For example, the user access point system can request access to an e-commerce website, a social media website, or any other website.

In some embodiments, at 504, a website system can retrieve one or more network resources for the requested website. For example, a network resource can comprise text, pictures, video, audio, and the like associated with the requested website. In some embodiments, the requested website can be a third-party website and/or a website related to the advertiser and/or personalized advertisement generation and management system. In some embodiments, the website system can identify locations of advertisement space on the website. For example, the website can comprise one or more designated spaces for advertising. In some embodiments, at 506, a website system can request one or more advertisements for the advertisement space from the advertiser and/or personalized advertisement generation and management system to display on the website.

In some embodiments, at 508, the advertiser and/or personalized advertisement generation and management system can identify products and/or services for advertising and/or a corresponding advertisement. In some embodiments, the products can be identified based on data received with the request for an advertisement. For example, the advertising system can identify a product and/or an advertisement based in part on the size of the ad space. In some embodiments, the product and/or service can be identified based on user information, as outlined herein. For example, a user's interest in particular products or services in past browser history can be used to identify products and/or services of interest. The advertiser and/or the personalized advertisement generation and management system can identify the corresponding advertisements for the products and/or services of interest.

In some embodiments, the advertiser and/or the personalized advertisement generation and management system can determine whether user information is retrievable, for example from an internal and/or external database, cookies, or the like. If the user information is not retrievable, the user access point system can request and receive user input and/or user information. In some embodiments, requesting and receiving user input and/or user information can be optional. In some embodiments, the system can be configured to send an email to the user, and the user can provide certain user information, for example by selecting one or more logos associated with the user. In some embodiments, the user access point system retrieves user information which is used to identify a logo.

User information can comprise a selection of one or more logos. User information can comprise a user's personal information, such as a user's name, and/or family status, membership in an organization, participation in an activity, age, gender, socio-economic class, preferred brands, user location, nationality, ethnicity, relationship status, home address, work address and any other ascertainable user characteristic. For example, a user's name and the fact that he is a father can be retrieved to identify products and/or services of interest, as well as corresponding advertisements. For example, the advertisement can be modified such that a mug includes the words "world's best dad" embroiled on the face. In some embodiments, user information can also comprise information such as demographic data, sex, race, economic status, age, level of education, income level and employment, psychiatric data, medical data, a personality trait, an interest, values, attitudes, lifestyles, opinions, preferences, likes or dislikes, predilections, purchase history, browser history, financial history and data, credit history and data, personal history and data, other activity data, and/or the like. For example, user information may comprise data indicating that the user is middle-aged, enjoys the outdoors, and is vegetarian. In some embodiments, user information can comprise data indicating an attribute. In some embodiments, an attribute can comprise a computing device (such as a cell phone, or a computer), a channel of communication (such as television. Internet, or a website), advertising media (such as a billboard or commercial), social media (such as a user profile or friends list on a social media website), a particular profile (financial profile for a certain region, subscriber profile for subscribers on a particular website, social media profile for a particular age), other information that can be used to direct a script to, and/or the like.

In some embodiments, at 510, the advertiser and/or the personalized advertisement generation and management system can obtain user information and/or user data. In some embodiments, the user access point system can transmit user information to the advertiser and/or the personalized advertisement generation and management system.

In some embodiments, the advertiser and/or personalized advertisement generation and management system can retrieve user information. In some embodiments, the system can be configured to retrieve user information via a user profile, a user identifier, a device identifier, cookie data associated with the user, and/or other data that can be used to retrieve user information. For example, a user professional social media profile identifier can be used to identify the current employer of the individual. The personalized logo can be a logo of the company. In some embodiments, cookie data can be used to identify past browsing history. In some embodiments, if the user visits a particular webpage frequently, a logo associated with a domain of that webpage can be used to retrieve the personalized logo. In some embodiments, cookie data can be used to identify user personal information. For example, cookie data can be used to identify a name or address of the user.

In some embodiments, a user can store a logo on a website, such as a third party website, where promotional goods can be sold. A user profile can be retrieved to determine or identify information associated with the user. For example, a cloud database can comprise a user profile for the user. In some embodiments, the advertiser and/or personalized advertisement generation and management system can access the user profile from the cloud database and/or identify information associated with the user, such as a user's name, phone number, title, location, logo, and the like. In some embodiments, the user profile can be a remote database, a cloud data center, a cloud service, and the like where the user profile can be associated with a company logo. The advertiser and/or personalized advertisement generation and management system can retrieve and/or modify the logo to send to a third party system. For example, the third party system can comprise an online e-commerce website, such as a website that wells promotional goods and services. In some embodiments, a third party system can provide one or more services to a seller and/or manufacturer of personalized products.

In some embodiments, the advertiser and/or personalized advertisement generation and management system can identify a plurality of logos. The advertiser and/or personalized advertisement generation and management system can select a plurality of logos to place onto a product for co-branding. For example, the advertiser and/or personalized advertisement generation and management system can communicate with a third party system to identify a logo for the user and a logo for the third party system, and place both logos on the image to send to the third party system. In some embodiments, the advertiser and/or personalized advertisement generation and management system can identify and/or generate a logo representative of two or more companies, entities, or individuals for co-branding.

In some embodiments, at 512, the advertiser and/or personalized advertisement generation and management system can determine and retrieve or generate a logo. In some embodiments, optionally, if the advertiser and/or the personalized advertisement generation and management system can retrieve a logo, the advertiser and/or the personalized advertisement generation and management system can determine whether the logo is retrievable from a database, such as an internal and/or external database.

In some embodiments, if the logo cannot be retrieved from a database, the advertiser and/or personalized advertisement generation and management system can retrieve one or more personalized logos based on user information. For example, the advertiser and/or personalized advertisement generation and management system can retrieve a logo by accessing a social media website or profile of a user, retrieving employer information, and/or identifying an employer logo.

In some embodiments, optionally, the advertiser and/or personalized advertisement generation and management system can be configured to retrieve the personalized logo by accessing a logo database. In some embodiments, the advertiser and/or personalized advertisement generation and management system can retrieve, for example, a name, a phone number, a title, a location, a logo, and the like based on the accessed user information.

In some embodiments, if the logo cannot be retrieved from a database, the advertiser and/or personalized advertisement generation and management system can be configured to automatically generate the logo. For example, the advertiser and/or personalized advertisement generation and management system can generate a square logo for a business card based on a retrieved logo. In some embodiments, the advertiser and/or personalized advertisement generation and management system can generate a pattern logo for a polo shirt. In some embodiments, the advertiser and/or personalized advertisement generation and management system can generate a rounded logo for coffee cups. In some embodiments, the advertiser and/or personalized advertisement generation and management system can generate and/or modify a logo automatically, semi-automatically, and/or manually.

In some embodiments, at 514, the advertiser and/or personalized advertisement generation and management system can modify the advertisement with the personalized logo. In some embodiments, the advertisement can comprise an audio file, an image, and/or a video file. The advertisement can comprise an ad banner that is modified to display the personalized logo.

In some embodiments, at 516, the advertiser and/or personalized advertisement generation and management system can optionally modify the advertisement for the ad space on the website. In some embodiments, at 518, the website system can optionally be configured to embed a selectable link into the advertisement, such has a URL.

In some embodiments, at 520, the user access point system can display the modified advertisement, and at 522, the user access point system can determine whether any additional ad space is available on the website. In some embodiments, if there is additional ad space on the website, the process can be configured to return to 506 to request advertisements for the additional ad space. Otherwise, in some embodiments, at 524, the user access point can receive and detect a user selection of the advertisement. In some embodiments, the user access point system can transmit a user selection of the advertisement to the website system.

In some embodiments, at 526, in some embodiments, the website system can identify the advertiser associated with the selected advertisement, and transmit notification to the corresponding advertiser that the user has made the advertisement selection.

In some embodiments, at block 528, the personalized logo and/or the advertisement selection can be saved to a user profile in a user profile database 530. The user profile database 530 can provide a collection of all the user profiles associated with product customization and preview advertisements generated by the system, all the characteristics associated with each user profile such as a user's advertisement selection, efficacy, and personalized logos, and/or a subset of either of these collections.

In some embodiments, at block 532, the advertiser and/or personalized advertisement generation and management system can generate a vector print ready file. The vector image file can be used by a printed (for example, a 3D printer) to print the image onto a personalized product. The vector image file can comprise various formats, such as a rasterized image file or a vectorized image file. In some embodiments, the vector image file can be modified based on user command, characteristics of a product, and/or characteristics of the logo image as will be described in further detail below. The vector image file can also be used to determine print characteristics (for example, the type of ink to be used during printing). The vector image file can also be used to be displayed on a user display device such as an augmented reality display.

In some embodiments, the advertiser system can initiate manufacture of the product with the personalized logo on the product. For example, the advertiser system can send the vector print ready file to a third-party entity to manufacture the product.

In some embodiments, the website system can comprise an e-commerce website. The website system can comprise an aggregated marketplace with personalized products.

In some embodiments, the website system can offer website services to an advertiser system. The advertiser system can be a company that desires to sell personalized products online. The website system can offer a service whereby the advertiser system can offer certain products, and the website system can automatically, semi-automatically, manually, and/or a combination thereof create personalized products for the consumer viewing the advertiser's products. Consumers can place orders on the website system for personalized products sold by the advertisers. The advertiser and/or personalized advertisement generation and management system can personalize the products for display on the website system.

In some embodiments, the products are sent, manufactured, and/or stored in the website system, the advertiser system, and/or the personalized advertisement generation and management system. The website system, the advertiser system, and/or the personalized advertisement generation and management system can manufacture the products with the personalized logo and/or can print the personalized logo on an already manufactured and stored product.

Figure 6:
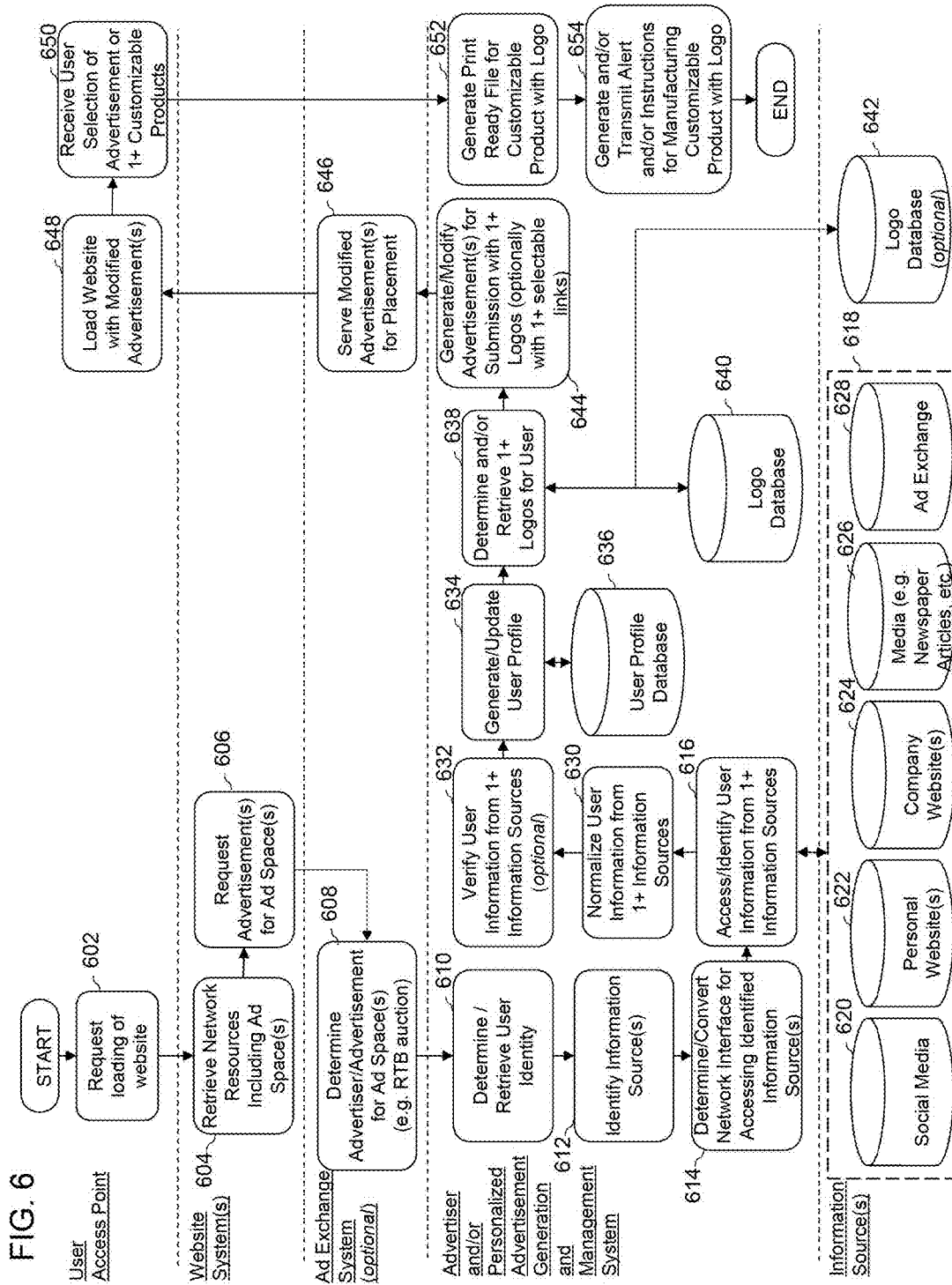
FIG. 6 is a flowchart illustrating another method of generating an enhanced personalized digital advertisement according to various embodiments described herein.

FIG. 6 is a flowchart illustrating another method of generating an enhanced personalized digital advertisement according to various embodiments described herein. In some embodiments, at 602, a user access point, via a web browser, may request loading of a website or web page.

In some embodiments, at 604, one or more website systems may retrieve network resources from a web server including one or more advertisement spaces. For example, a network resource can comprise text, pictures, video, audio, and the like associated with the requested website. In some embodiments, the requested website or web page can be a third-party website and/or a website related to an advertiser and/or personalized advertisement generation and management system. In some embodiments, the website system can identify locations of advertisement space on the website. For example, the website can comprise one or more designated spaces for advertising. In some embodiments, at 606, the one or more website systems can request one or more advertisements for the advertisement space from the advertiser and/or personalized advertisement generation and management system to display on the website.

In some embodiments, at 608, optionally, an advertisement exchange system may determine an advertiser and/or advertisement to be placed in the advertisement space. In some embodiments, the advertiser/advertisement may be determined through RTB, as discussed in detail herein.

In some embodiments, at 610, the advertiser and/or personalized advertisements generation and management system may determine and/or retrieve a user identity. In some embodiments, the identity of the user is retrieved from a third-party database. In some embodiments, the third-party database may be an advertisement exchange. In some embodiments, the identity of the user may be determined through a cookie embedded in the requested website or web page.

In some embodiments, at 612, the advertiser and/or personalized advertisements generation and management system may identify one or more information sources 618 from which user information may be obtained or determined. In some embodiments, the information sources 618 may comprise one or more social media websites 620, company websites 624, personal websites 622, news media websites 626, and ad exchange databases 628. In some embodiments, the information sources can comprise internal or external databases or any of the information sources described herein, including, for example, customer relationship management (CRM) platforms, social media platforms, media platforms, cookie pools, external publications and platforms, advertisement servers, analytics platforms, publishers, third-party providers, and/or any other information source.

In some embodiments, at 614, the advertiser and/or personalized advertisements generation and management system may determine/convert one or more network interfaces for accessing the one or more identified information sources. Different information sources can use different network interfaces for communication. As such, in order to be able to obtain information from a plurality of information sources, it can be technically advantageous for the system to be configured to automatically and/or dynamically determine and/or convert its network interface to allow communication with a plurality of different network interfaces and/or protocols. In some embodiments, determining or converting one or more network interfaces is based at least in part on one or more communication protocols used by the one or more information sources. In some embodiments, the one or more network interfaces comprise an application programming interface (API).

In some embodiments, at 616, the advertiser and/or personalized advertisements generation and management system may identify and/or access user information from the one or more information sources. The user information may comprise any of the user information types described herein.

In some embodiments, at 630, the advertiser and/or personalized advertisements generation and management system may normalize the user information from the one or more information sources. In some embodiments, the personalized advertisements generation and management system may be configured to interface with a plurality of disparate databases and/or information sources which store data having a plurality of incongruent data structures. In some embodiments, the personalized advertisements generation and management system may be configured to interface with these data structures and conduct a normalization process to transform the data into a single, unified data structure. In some embodiments, normalization of the user information data can increase the accuracy and efficiency of verifying the user information and determining/retrieving a logo or graphic to use in a personalized product advertisement. In some embodiments, normalizing the user information retrieved from the one or more identified information sources comprises translating a data structure of the retrieved user information from the one or more identified information sources.

In some embodiments, at 632, the advertiser and/or personalized advertisements generation and management system may optionally verify the user information obtained from the one or more information sources. In some embodiments, verification comprises any of the verification methods described herein. In some embodiments, verification may comprise cross-checking user information from one or more user information sources with user information from one or more other user information sources. In some embodiments, verification may comprise cross-checking user information of a first user with user information of a second, possibly related user. For example, a first user's information may be cross-checked with user information of the first user's family members, friends, or colleagues, as determined by the advertiser and/or personalized advertisements generation and management system or as categorized in the one or more information sources.

In some embodiments, at 634, the advertiser and/or personalized advertisements generation and management system may generate a user profile for the user comprising the retrieved user information. In some embodiments, the user profile may be stored in a user profile database 636, such that it can be accessed more efficiently on subsequent website or web page requests by a user. In some embodiments, a user profile may already exist for a user, in which case the user profile can be updated with any new user information obtained from the one or more information sources.

In some embodiments, at 638, the advertiser and/or personalized advertisements generation and management system may determine and/or retrieve one or more logos based on the user information, as described in detail herein. In some embodiments, the one or more logos can be retrieved from a system logo database 640. In some embodiments, the one or more logos can optionally be retrieved from an external or third-party logo database 642. For example, the external logo database 642 may comprise a Google image database, a social media image database, or any other logo or image database. In some embodiments, the system can be configured to utilize an API for an external or third-party database that allows search and/or retrieval of one or more logos from the external or third-party database for incorporating into a targeted and/or customized advertisement.

In some embodiments, at 644, the advertiser and/or personalized advertisements generation and management system may generate and/or modify the advertisement by inserting the one or more logos and/or one or more selectable links within the advertisement, as discussed in detail herein.

In some embodiments, at 646, the optional ad exchange system or the advertiser and/or personalized advertisements generation and management system may serve the modified advertisement for placement on the requested website or web page.

In some embodiments, at 648, the user access point, via a web browser, may load and display the website or web page with the modified advertisement therein. In some embodiments, at 650, the user access point may receive a user selection of the advertisement and/or selectable links, which may direct the user to a product purchase page. In some embodiments, the user may purchase the customizable product through the product purchase.

In some embodiments, at 652, upon purchase selection and/or confirmation, the advertiser and/or personalized advertisements generation and management system may generate a print-ready file of the customizable product with the logo inserted therein. In some embodiments, upon receiving a selection of the one or more customizable products comprising the one or more logos for purchase on the purchase website, the advertiser and/or personalized advertisements generation and management system may dynamically generate a print-ready file for printing the one or more logos on the selected one or more customizable products.

In some embodiments, at 654, the advertiser and/or personalized advertisements generation and management system may electronically transmit the print-ready file and/or instructions to a manufacturing system, wherein the transmitting of the print-ready file to the manufacturing system causes manufacturing of the one or more customizable products comprising the one or more logos. In some embodiments, the advertiser and/or personalized advertisements generation and management system may electronically transmit the alert to the manufacturing system, wherein the transmitting of the alert initiates manufacturing of the one or more customizable products comprising the one or more logos. In some embodiments, the manufacturing is completed by advertiser or the owner of the personalized advertisements generation and management system. In some embodiments, the manufacturing is completed by a third-party.

Personalized Advertisement Generation and Management System

Figure 7:
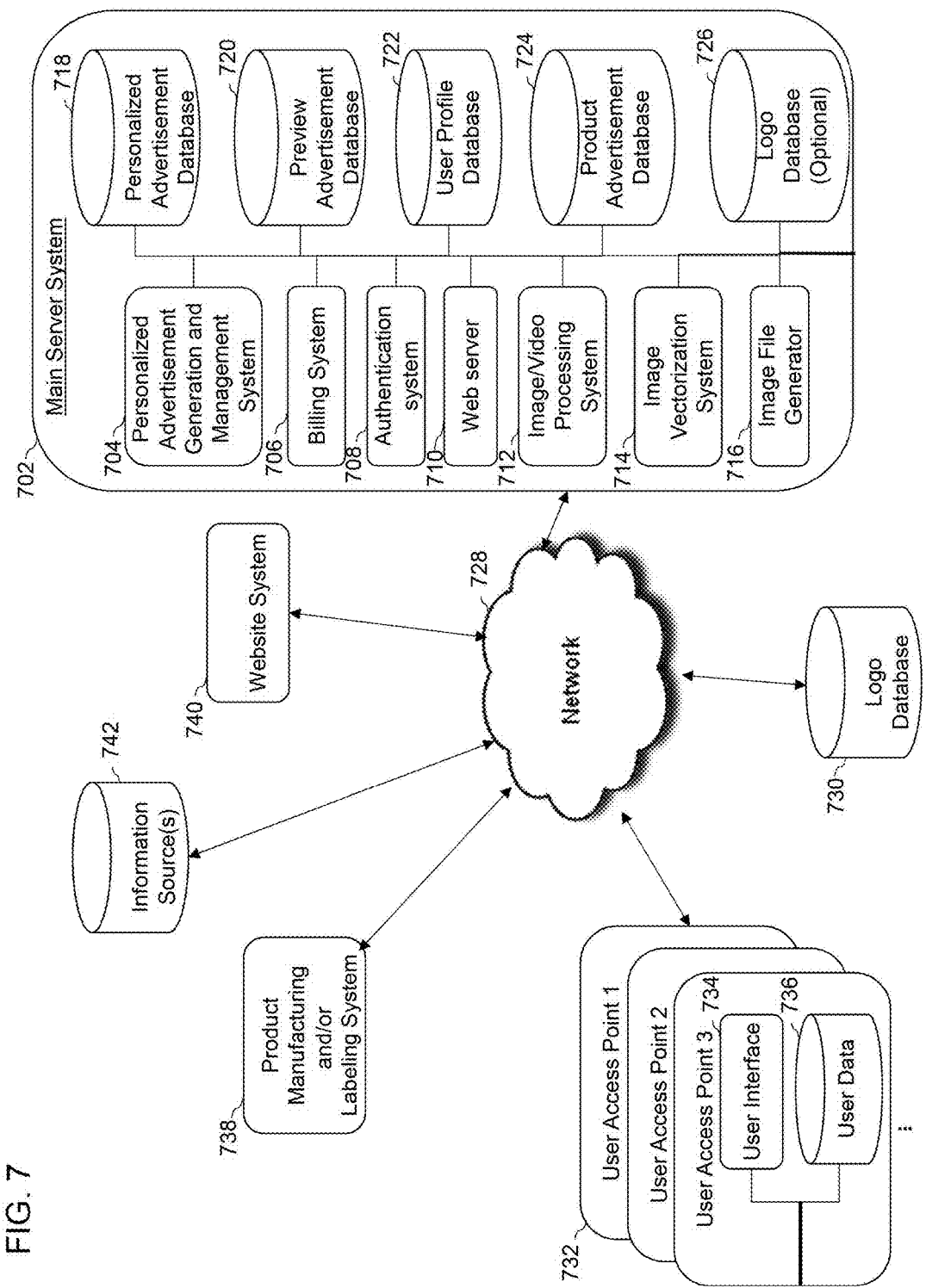
FIG. 7 is a schematic diagram illustrating a personalized advertisement generation and management system according to various embodiments described herein.

FIG. 7 is a schematic diagram illustrating a personalized advertisement generation and management system according to various embodiments. In some embodiments, a main server system 702 can be comprised of a personalized advertisement generation and management system 704, a billing system 706, an authentication system 708, a web server 710, an image/video processing system 712, an image vectorization system 714, an image file generator 716, a personalized advertisement database 718, a preview advertisement database 720, a user profile database 722, a product advertisement database 724, and/or a logo database 726. The main server system can be connected to a network 728. The network can be configured to connect the main server to an external logo database 730, a product manufacturing and/or labeling system 738, a website system 740, and/or one or more user access point systems 732.

The personalized advertisement generation and management system 704 can be configured to generate a personalized advertisement. In some embodiments, the personalized advertisement can be associated with a user's name, address, preferences, previous history information, information retrieved from a user's behavior on another website and/or other internet activity, and/or the like. The billing system 706 can be configured to charge users for various provided services using any available payment methods. The authentication system 708 can be configured to verify information associated with the user (for example, information inputted by the user, retrieved information based on a user's IP address, and/or the like). The web server 710 can be configured to serve files that from web pages at the request of users.

The results of the verification process can be used to verify the user information and/or the website. Using the personalized advertisement generation and management system, a user's previous configurations or customizations can be retrieved. This improves the process of integrating product and logo image by allowing a user to visit a page at a later time and being able to retrieve previous advertisements and/or advertisement configurations. Once a user and/or user information is verified, a user profile can be used to retrieve other customizations that can automatically be applied to a user's future browsing requests.

Processing of the advertisement customization (for example, the customization of a logo image onto an image of a product in the advertisement) can be performed by the main server system 702 and/or personalized advertisement generation and management system 704. Accordingly, the main server system 702 and/or personalized advertisement generation and management system 704 can perform the steps of processing, storing, generating, transmitting, and receiving on a remote server instead of performing such processing on the client device. As such, processing can be offloaded to a remote server, storage of the computations, results, and input needed for the results can be stored on the server rather than on the client device, and the required throughput can be reduced based (for example, the results can be sent instead of all inputs needed to determine the result to the client device).

The personalized advertisement database 718 can provide a collection of all product customization and preview advertisements generated or identified by the system or a subset that collection. The preview advertisement database 720 can provide a collection of advertisements that show a preview of a personalized product where one or more logo images are superimposed onto one or more product images. The user profile database 722 can provide a collection of all the user profiles associated with product customization and preview advertisements generated by the system, all the characteristics associated with each user profile such as a user's customization preference, and/or a subset of either of these collections.

In some embodiments, the personalized advertisement generation and management system can comprise an indication of the user's user access point 732 an IP address or browser cookie information. The cookie information can be used to identify a user's browsing history to determine the personalized logo to be used in the preview advertisement.

The product advertisement database 724 can provide a collection of advertisements of products that are available on the main server system. The product advertisement database 724 can comprise advertisements of products being marketed and/or sold on the website. The advertisements can comprise an image, video, audio clips, and/or the like.

The logo database 726 can provide a collection of images, videos, and/or audio files that can be superimposed onto an advertisement. The main server system 702 can comprise an internal logo database 726. The network 728 can allow the main server system 702 to exchange data with one or more external databases and one or more user access points 732. The external logo database 730 can provide a collection of logo images that can be stored within the main server system, that the system can retrieve, reference, and/or display on a user's screen for use in the various embodiments. The user access points 732 can provide users with an interface to access and communicate with the main server system, and to utilize the functional aspects of the system. The user access points 732 can comprise a user interface 734 to display images to the user and to allow users to enter commands. The user access points 732 can comprise user data 736 that can be stored with the user profile.

The main server system 702 can communicate with a product manufacturing and/or labeling system 738. The main server system 702 can finalize the superposition of a logo file from the logo database 726 onto a product advertisement from the product advertisement database 724. The main server system 702 can create a print ready file and/or package for the product manufacturing and/or labeling system 738 to manufacture the product and/or to label the product with the logo according to the customizations performed on the advertisement.

Computer System

Figure 8:
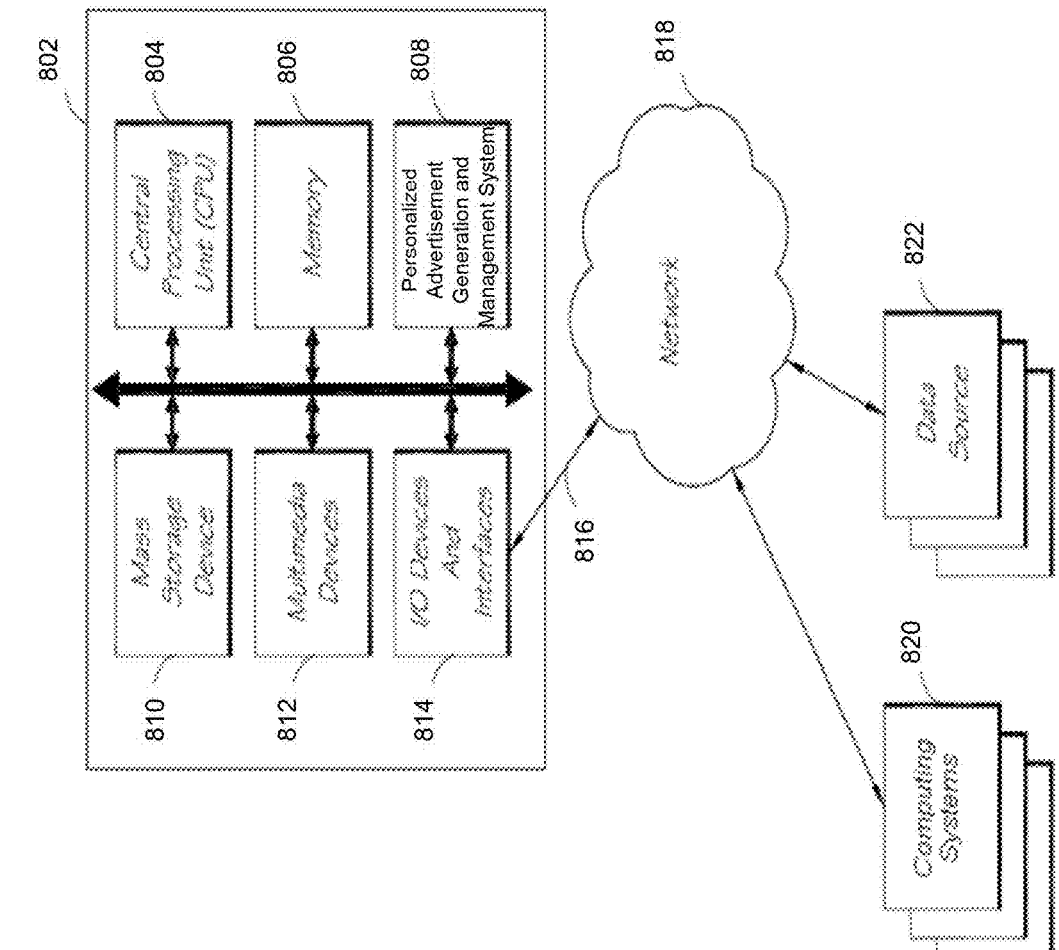
FIG. 8 is a block diagram depicting a computer hardware system configured to run software for implementing one or more embodiments of a personalized advertisement generation and management system according to various embodiments described herein.

In some embodiments, the systems, processes, and methods described herein are implemented using a computing system, such as the one illustrated in FIG. 8. The example computer system 802 is in communication with one or more computing systems 820 and/or one or more data sources 822 via one or more networks 818. While FIG. 8 illustrates an embodiment of a computing system 802, it is recognized that the functionality provided for in the components and modules of computer system 802 can be combined into fewer components and modules, or further separated into additional components and modules.

Computing System Components

The computer system 802 can comprise personalized advertisement generation and management system 808 that carries out the functions, methods, acts, and/or processes described herein. The computer system 802 can comprise personalized advertisement generation and management system 808 is executed on the computer system 802 by a central processing unit 804 discussed further below.

In general the word "module," as used herein, refers to logic embodied in hardware or firmware or to a collection of software instructions, having entry and exit points. Modules are written in a program language, such as JAVA, C, or C++, or the like. Software modules can be compiled or linked into an executable program, installed in a dynamic link library, or can be written in an interpreted language such as BASIC, PERL, LAU, PHP or Python and any such languages. Software modules can be called from other modules or from themselves, and/or can be invoked in response to detected events or interruptions. Modules implemented in hardware include connected logic units such as gates and flip-flops, and/or can comprise programmable units, such as programmable gate arrays or processors.

Generally, the modules described herein refer to logical modules that can be combined with other modules or divided into sub-modules despite their physical organization or storage. The modules are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

The computer system 802 includes one or more processing units (CPU) 804, which can comprise a microprocessor. The computer system 802 further includes a physical memory 806, such as random access memory (RAM) for temporary storage of information, a read only memory (ROM) for permanent storage of information, and a mass storage device 810, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 802 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 802 includes one or more input/output (I/O) devices and interfaces 814, such as a keyboard, mouse, touch pad, and printer. The I/O devices and interfaces 814 can comprise one or more display devices, such as a monitor, that allows the visual presentation of data to a user. More particularly, a display device provides for the presentation of GUIs as application software data, and multi-media presentations, for example. The I/O devices and interfaces 814 can also provide a communications interface to various external devices. The computer system 802 can comprise one or more multi-media devices 812, such as speakers, video cards, graphics accelerators, and microphones, for example.

Computing System Device/Operating System

FIG. 8 is a block diagram depicting an embodiment of a computer hardware system configured to run software for implementing one or more embodiments of a personalized advertisement generation and management.

The computer system 802 can run on a variety of computing devices, such as a server, a Windows server, a Structure Query Language server, a Unix Server, a personal computer, a laptop computer, and so forth. In other embodiments, the computer system 802 can run on a cluster computer system, a mainframe computer system and/or other computing system suitable for controlling and/or communicating with large databases, performing high volume transaction processing, and generating reports from large databases. The computing system 802 is generally controlled and coordinated by an operating system software, such as z/OS, Windows, Linux, UNIX, BSD, PHP, SunOS, Solaris, MacOS, ICloud services or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 802 illustrated in FIG. 8 is coupled to a network 818, such as a LAN, WAN, or the Internet via a communication link 816 (wired, wireless, or a combination thereof). Network 818 communicates with various computing devices and/or other electronic devices. Network 818 is communicating with one or more computing systems 820 and one or more data sources 822. The computer system 802 can comprise a personalized advertisement generation and management system 808 can access or can be accessed by computing systems 820 and/or data sources 822 through a web-enabled user access point. Connections can be a direct physical connection, a virtual connection, and other connection type. The web-enabled user access point can comprise a browser module that uses text, graphics, audio, video, and other media to present data and to allow interaction with data via the network 818.

The output module can be implemented as a combination of an all-points addressable display such as a cathode ray tube (CRT), a liquid crystal display (LCD), a plasma display, or other types and/or combinations of displays. The output module can be implemented to communicate with input devices and/or interfaces 814 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module can communicate with a set of input and output devices to receive signals from the user.

Other Systems

The computing system 802 can comprise one or more internal and/or external data sources (for example, data sources 822). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 802 can also access one or more data sources 822. The data sources 822 can be stored in a database or data repository. The computer system 802 can access the one or more data sources 822 through a network 818 or can directly access the database or data repository through I/O devices and interfaces 814. The data repository storing the one or more data sources 822 can reside within the computer system 802.

URLs and Cookies

In some embodiments, one or more features of the systems, methods, and devices described herein can utilize a URL and/or cookies, for example for storing and/or transmitting data or user information. A Uniform Resource Locator (URL) can comprise a web address and/or a reference to a web resource that is stored on a database and/or a server. The URL can specify the location of the resource on a computer and/or a computer network. The URL can comprise a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can comprise a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can comprise data sent from a website and/or stored on a user's computer. This data can be stored by a user's web browser while the user is browsing. The cookies can comprise useful information for websites to remember prior browsing information, such as a shopping cart on an online store, clicking of buttons, login information, and/or records of web pages or network resources visited in the past. Cookies can also comprise information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

ALTERNATIVE EMBODIMENTS

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments can be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

What is claimed is:

1. A computer-implemented method for dynamically generating a personalized online advertisement for one or more customizable products, the method comprising:
   determining or retrieving, by a computer system, an identity of a first user requesting a web site by use of one or more cookies embedded in the web site;
   determining, by the computer system, an advertisement for one or more customizable products for placement within an advertisement space on the website for viewing by the first user;
   dynamically obtaining, by the computer system, information of an employer or organization of the first user based at least in part on the identity of the first user by:
      identifying a plurality of information sources that comprise information of the employer or organization of the first user, wherein the plurality of identified information sources comprise one or more social media websites, company websites, personal websites, news media websites, or ad exchange databases;
      determining or converting one or more network interfaces of the computer system for communicating with the plurality of identified information sources;
      automatically retrieving information of the employer or organization of the first user from the plurality of identified information sources through the one or more network interfaces; and
      normalizing the information of the employer or organization of the first user retrieved from the plurality of identified information sources;
   verifying, by the computer system, the retrieved information of the employer or organization of the first user, wherein the verifying comprises:
      comparing the retrieved information of the employer or organization of the first user from a first information source of the plurality of identified information sources with information of the employer or organization of the first user from a second information source of the plurality of identified information sources;
      dynamically calculating whether the first information source and the second information source of the plurality of identified information sources meet a sufficient threshold accuracy level; and
      cross-checking the retrieved information of the employer or organization of the first user with an information source associated with a second user, wherein the associated information source comprises a second user social media website, a second user company website, a second user personal website, or a second user news media website, and wherein the second user has been determined, by the computer system, to be a family member, friend, or colleague of the first user;
   modifying, by the computer system, the determined advertisement for one or more customizable products by:
      identifying one or more locations for logo placement on the one or more customizable products determined by a spatial analysis of the one or more customizable products, wherein the spatial analysis comprises an optimization of visibility of one or more logos on the one or more customizable products, and wherein each of the one or more locations for logo placement comprises a geometric shape having a size, determined by the computer, based at least in part on one or more characteristics of the one or more customizable products;
      identifying and retrieving, by the computer system from a logo database, one or more logos associated with the dynamically obtained and verified information of the employer or organization of the first user, wherein the identifying the one or more logos is based at least in part on one or more characteristics of the one or more locations for logo placement on the one or more customizable products;
      altering, by the computer system, the one or more logos to be compatible with the one or more locations for logo placement;

graphically embedding the one or more logos associated with the employer or organization of the first user onto the one or more locations for logo placement on the one or more customizable products; and
embedding one or more selectable links on the determined advertisement, wherein selecting the one or more selectable links causes retrieval of a purchase website for purchasing the one or more customizable products comprising the one or more logos; and
transmitting, by the computer system, the modified advertisement for one or more customizable products for placement on the website for viewing by the first user,
wherein the computer system comprises a computer processor and an electronic storage medium.

2. The computer-implemented method of claim 1, further comprising:
receiving, by the computer system, a selection of the one or more customizable products comprising the one or more logos for purchase on the purchase website;
dynamically generating, by the computer system, a print-ready file for printing the one or more logos on the selected one or more customizable products; and
electronically transmitting, by the computer system, the print-ready file to a manufacturing system, wherein the transmitting of the print-ready file to the manufacturing system causes manufacturing of the one or more customizable products comprising the one or more logos.

3. The computer-implemented method of claim 1, further comprising:
receiving, by the computer system, a selection of the one or more customizable products comprising the one or more logos for purchase on the purchase website;
dynamically generating, by the computer system, an alert to a manufacturing system to manufacture the one or more customizable products comprising the one or more logos; and
electronically transmitting the alert to the manufacturing system, wherein the transmitting the alert initiates manufacturing of the one or more customizable products comprising the one or more logos.

4. The computer-implemented method of claim 1, wherein the identity of the first user is retrieved from a third-party database.

5. The computer-implemented method of claim 4, wherein the third-party database is an advertisement exchange.

6. The computer-implemented method of claim 1, wherein the one or more cookies is embedded in a header of the website.

7. The computer-implemented method of claim 1, wherein automatically retrieving information of the employer or organization of the first user from the plurality of identified information sources comprises crawling the plurality of identified information sources.

8. The computer-implemented method of claim 1, wherein the one or more logos comprise a first logo and a second logo, wherein the one or more customizable products comprises a first customizable product and a second customizable product, wherein the first logo is graphically embedded on one or more locations for logo placement on the first customizable product, and wherein the second logo is graphically embedded on one or more locations for logo placement on the second customizable product.

9. The computer-implemented method of claim 1, wherein the determining or converting the one or more network interfaces is based at least in part on one or more communication protocols used by the plurality of identified information sources.

10. The computer-implemented method of claim 1, wherein the normalizing the information of the employer or organization of the first user retrieved from the plurality of identified information sources comprises translating a data structure of the retrieved information from the plurality of identified information sources.

11. The computer-implemented method of claim 1, wherein the modified advertisement comprises a link for purchasing each of the one or more customizable products comprising the one or more logos.

12. The computer-implemented method of claim 1, wherein the plurality of identified information sources comprises information of a third-party, wherein the third-party is associated with the first user, and wherein the information of the third-party is used for verifying the information of the employer or organization.

13. The computer-implemented method of claim 1, wherein the logo database comprises a third-party database accessible by the computer system through a third-party API.

14. The computer-implemented method of claim 1, wherein the computer system comprises the logo database.

15. The computer-implemented method of claim 1, wherein the computer system comprises a user profile database.

16. The computer-implemented method of claim 15, further comprising:
generating, by the computer system, a user profile comprising the retrieved information of the employer or organization; and
storing, in the user profile database, the user profile.

17. The computer-implemented method of claim 16, wherein the user profile is updated to reflect a selection of the one or more selectable links by the first user.

18. The computer-implemented method of claim 1, wherein determining an advertisement for the one or more customizable products comprises a real-time bidding (RTB) on the advertisement space.

19. The computer-implemented method of claim 1,
wherein the dynamically calculating is based at least in part on the verification of the retrieved information of the employer or organization.

20. The computer-implemented method of claim 19, wherein the one or more logos are generic logos when the retrieved information of the employer or organization does not meet the threshold sufficiency level.

* * * * *

UNITED STATES PATENT AND TRADEMARK OFFICE
CERTIFICATE OF CORRECTION

PATENT NO.         : 10,248,971 B2                                     Page 1 of 1
APPLICATION NO.    : 16/125370
DATED              : April 2, 2019
INVENTOR(S)        : Martin Roy Varley It is certified that error appears in the above-identified patent and that said Letters Patent is hereby corrected as shown below:

In the Specification

In Column 10, Line 32, change "100B" to --110B--.

In the Claims

In Column 25, Line 59, Claim 1, change "web site" to --website--.

In Column 25, Line 60, Claim 1, change "web site;" to --website;--.

Signed and Sealed this
Twenty-second Day of October, 2019

Andrei Iancu
*Director of the United States Patent and Trademark Office*